United States Patent [19]

Suzuki

[11] Patent Number: 5,580,199
[45] Date of Patent: Dec. 3, 1996

[54] FASTENING SCREW

[75] Inventor: Yasuo Suzuki, Saitama, Japan

[73] Assignee: Kabushiki Kaisha Suzuki Rashi Seisakusho, Saitama, Japan

[21] Appl. No.: 425,669

[22] Filed: Apr. 17, 1995

Related U.S. Application Data

[63] Continuation of Ser. No. 83,224, Jun. 29, 1993, abandoned.

[51] Int. Cl.$^6$ .................................................. F16B 39/282
[52] U.S. Cl. ......................... 411/188; 411/308; 411/399; 411/423
[58] Field of Search ...................... 411/184, 187, 411/188, 399, 307, 308, 309, 310, 311, 414, 415, 423, 957, 167, 168, 186, 185, 189, 312, 335, 937.2, 334, 929

[56] References Cited

U.S. PATENT DOCUMENTS

| | | | |
|---|---|---|---|
| 2,128,757 | 8/1938 | Olson | 411/187 |
| 2,152,681 | 4/1939 | Caminez | 411/423 |
| 2,562,032 | 7/1951 | Gutensohn | 411/188 X |
| 3,530,760 | 9/1970 | Lindstrand | 411/416 |
| 3,701,372 | 10/1972 | Breed | 411/309 |
| 3,877,339 | 4/1975 | Muenchinger | 411/960 X |
| 4,294,300 | 10/1981 | Bouwman | 411/188 X |

FOREIGN PATENT DOCUMENTS

| | | | |
|---|---|---|---|
| 4-175508 | 6/1992 | Japan. | |
| 4-219511 | 8/1992 | Japan. | |
| 194042 | 1/1965 | Sweden | 411/311 |
| 687622 | 2/1953 | United Kingdom | 411/307 |
| 2047837 | 12/1980 | United Kingdom | 411/188 |
| 2172950 | 10/1986 | United Kingdom | 411/311 |

*Primary Examiner*—Rodney M. Lindsey
*Attorney, Agent, or Firm*—Lowe, Price, LeBlanc & Becker

[57] ABSTRACT

A fastening screw is provided with a locking function to prevent loosening thereof after being tightened. In one aspect of the invention, the fastening screw has a head having a bearing face; a plurality of convex portions and concave portions formed on the bearing face to provide shallow wavelike portions proceeding in a circumferential direction of the bearing face; and a thread portion having a flat top portion, the width of the flat portion being larger than that of a root of a thread portion of an internal thread, wherein the angle between a slant surface of the fastening screw on a screw-tightening side and a line vertical to an axis of the fastening screw is substantially equal to the angle between a slant surface of the internal thread on a screw-loosening side and the line vertical to the axis of the fastening screw, and the angle between a slant surface of the fastening screw on the screw-loosening side and the vertical line is smaller than the angle between the slant surface of the fastening screw on the screw-tightening side and the vertical line.

7 Claims, 3 Drawing Sheets

FASTENING SCREW

This application is a continuation of application Ser. No. 08/083,224 filed Jun. 29, 1993, now abandoned.

BACKGROUND OF THE INVENTION

1. Field of the Invention

The present invention relates to a fastening screw, and more particularly to a fastening screw with a lacking function for preventing loosening thereof after being tightened.

2. Description of the Prior Art

A fastening screw is used in a variety of..industrial field since it can be used for connecting a plurality of members with ease. However, in this kind of screw, generally, the torque for loosening the screw is small and the screw is susceptible to inverse rotation or loosening due to vibration after being tightened.

To solve the problem, a spring washer, double nuts or the like are applied when bolts and nuts are used. Further, when the tapping screw is adopted, a locking washer or bonding agent is preferably adapted.

The present inventor has proposed a tapping screw suitable for synthetic resin in Japanese Patent Application No. Heisei 2-246203, and another fastening screw with locking function which is preferably used for relatively soft metal such as an aluminum die casting in Japanese Patent Application No. Heisei 2-411007.

However, the above fastening screws are not suitable for a thin plate such as a thin steel plate, and no fastening screw is proposed to effectively prevent the loosening thereof when used for the thin plate.

SUMMARY OF THE INVENTION

It is therefore the principal object of the present invention to provide a fastening screw with a locking function, which can be used for a relatively thin material such as a thin steel plate. To accomplish the object described above, the fastening screw according to the present invention is characterized in that a bearing surface of a head of the fastening screw has a plurality of convex portions and concave portions to provide wavelike portions proceeding in a circumferential direction of said bearing face.

Another fastening screw according to the present invention is characterized in that a thread portion thereof is provided with a flat top portion of which width is larger than that of a root of a thread portion of an internal thread adapted to the fastening screw, and the angle between a slant surface of the fastening screw on a screw-tightening side and a line vertical to an axis of said fastening screw is substantially equal to the angle between a slant surface of the internal thread on a screw-loosening side land the line vertical to the axis of the fastening screw, and the angle between a slant surface of the fastening screw on the screw-loosening side and the vertical line is smaller than the angle between the slant surface of the internal thread on the screw-tightening side and the vertical line.

With the structure of the fastening screw described above, when the fastening screw is screwed into the internal thread and the bearing surface of the head of the fastening screw comes in contact with a surface of the internal thread material around a tapped hole, the convex and concave portions on the bearing portion bite into the internal thread with deforming of the internal thread member occurring due to fastening force from the screw. As a result, a contact area between the bearing face and the internal thread member is increased to increase the friction force, which resists a torque in the screw-loosening direction.

The internal thread is formed on the internal thread member, and the fastening screw as a bolt or a machine screw is screwed to the internal thread. As described above, the width of the top of the thread of the fastening screw is larger than that of the root where the top flat portion engages the internal thread, and the slant surface of the fastening screw on the screw-tightening side is substantially in parallel to the opposing slant surface of the internal thread, and the slant surface of the fastening screw on the screw-loosening side is steeper than the slant surface of the fastening screw on the screw-tightening side, permitting an end portion of the top of the thread of the fastening screw on the screw-loosening side to bite into the internal thread to proceed into the internal thread and thereby forming an auxiliary internal thread. As a result, the slant surface of the fastening screw on the screw-tightening side is pushed on the opposing slant surface of the internal thread with large force, which provides a friction force to resist the torque in the screw-loosening direction in combination with another friction force caused by the engagement of the auxiliary internal thread.

BRIEF DESCRIPTION OF THE DRAWINGS

The present invention will become more apparent from the following description with reference to the accompanying drawing, wherein.

DETAILED DESCRIPTION OF PREFERRED EMBODIMENTS

Embodiments of the present invention will be explained with reference to the drawings.

Figure 1A:
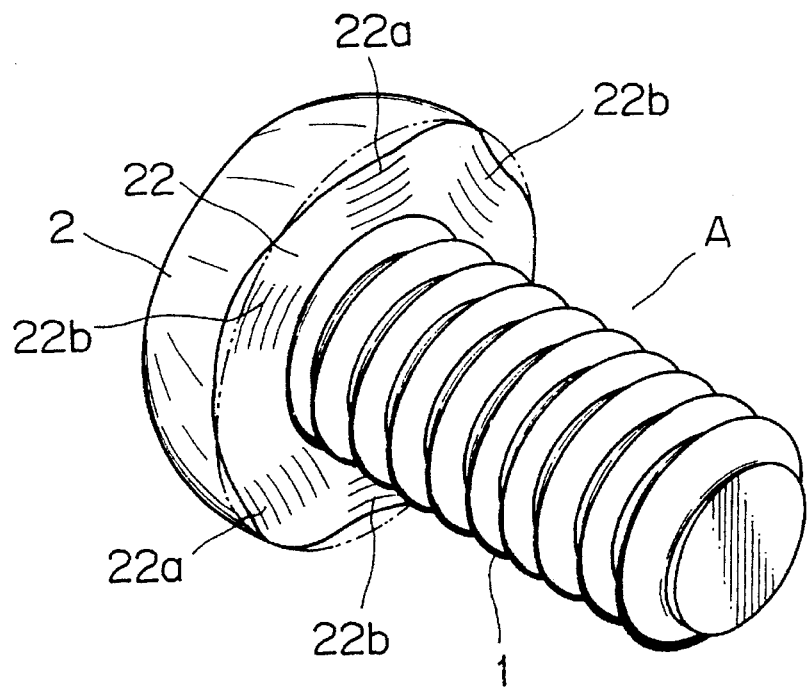
FIG. 1A is a perspective view of a fastening screw according to a first embodiment of the preset invention.

FIG. 1A is a perspective view of a fastening screw according to the first embodiment of the present invention. A fastening screw A consists of a thread portion 1 and a head 2. A plurality of convex and concave portions 22a and 22b are formed on a bearing face 22 of the head 2 to provide wavelike portions having a shape of a sine curve, which proceeds in a circumferential direction of the bearing face.

Figure 1B:
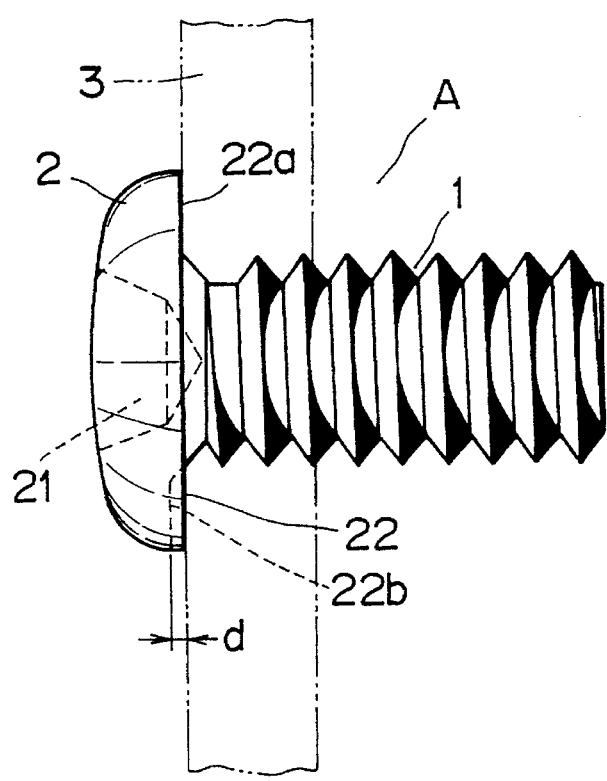
FIGS. 1B and 1C are a front view and a right side view respectively of the fastening screw.
Figure 1C:
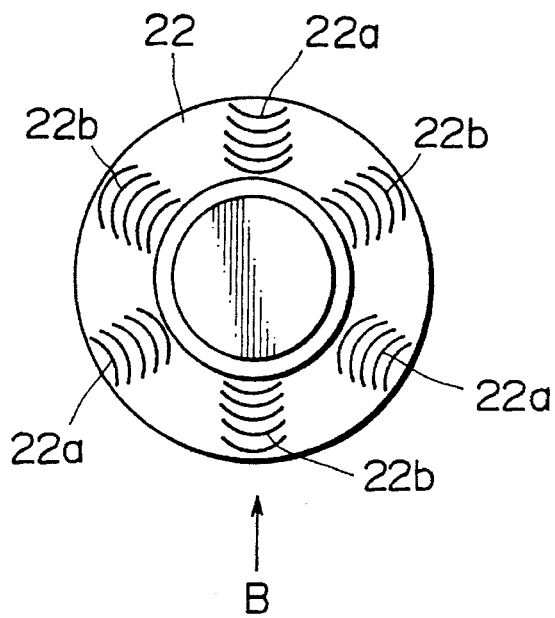
Figure 1D:
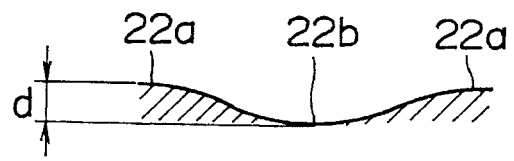
FIG. 1D is a cross-sectional view of a wavelike portion on the bearing face of the fastening screw shown in FIG. 1B seen from an arrow B.

FIGS. 1B and 1C are a front view and a right side view of the fastening screw. Further, FIG. 1D shows a cross-sectional view of the wavelike portion of the bearing face. 3 is an internally thread member such as a thin plate engaged by the external threads of screw A, and 21 is a cross-shaped recess for a screwdriver. The depth d of the wavelike portions is determined based on the hardness of the head of the fastening screw and the internal thread portion of the thin plate and the like, and the number of convex portions or the concave portions are not limited to a prescribed number. In the preferred embodiment of the present invention shown in FIGS. 1A to 1D, the depth of the wavelike portions are 4/100 mm and the diameter of the thread of the fastening screw is 5 mm, and the three convex portions and three concave portions are formed with regular intervals in the circumferential direction of the bearing face.

When the fastening screw A with the structure described above is screwed to the internal thread member 3 and is strongly fastened so that the bearing face becomes in contact with the internal thread member material, the bearing face 22 is strongly pushed on the internal thread material. The convex and concave portions of the bearing face 22 are shallow and formed as wavelike portions, so that the internally threaded member 3 is prone to be deformed along the wavelike portions, which allows the bearing face 22 to tightly be contact with the internal thread member 3 at almost overall area of the bearing face 22. As a result, even if a torque is applied to the fastening screw in the screw-loosening direction after the screw is tightened, the friction force between the bearing face and the internal thread portion becomes strong to prevent the loosening of the screw.

Figure 2:
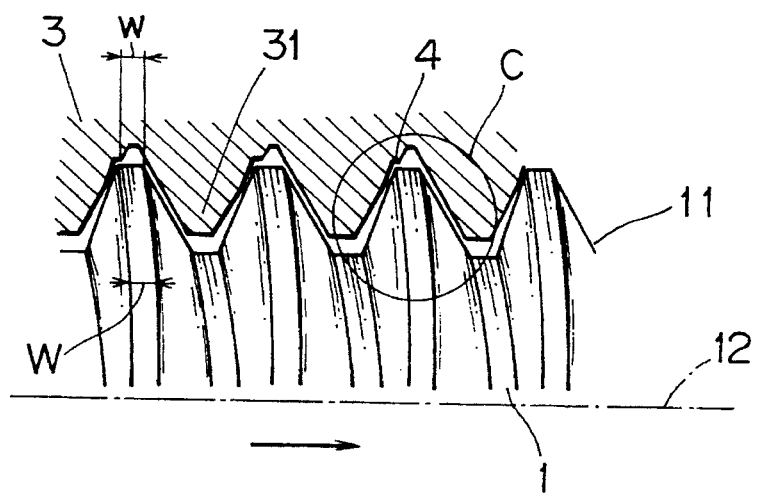
FIG. 2 is a partially cross-sectional view of a fastening screw with an asymmetrical thread according to a second embodiment of the present invention and an internal thread adapted to the thread of the fastening screw.

FIG. 2 shows a fastening screw with an asymmetrical thread according to the second embodiment of the present invention and an internal thread adapted to the thread of the fastening screw. In the figure, a thread portion 1 of the fastening screw engages an internal thread 31 of an internal thread member 3. An arrow in the figure indicates the direction that the fastening screw proceeds when fastened. A thread 11 of the thread portion 1 is provided with a flat top portion having a surface parallel to the direction that the fastening screw proceeds and along a spiral of the thread. The width W of the flat portion is larger than the width w of the root where the top flat portion engages the internal thread 31.

Figure 3:
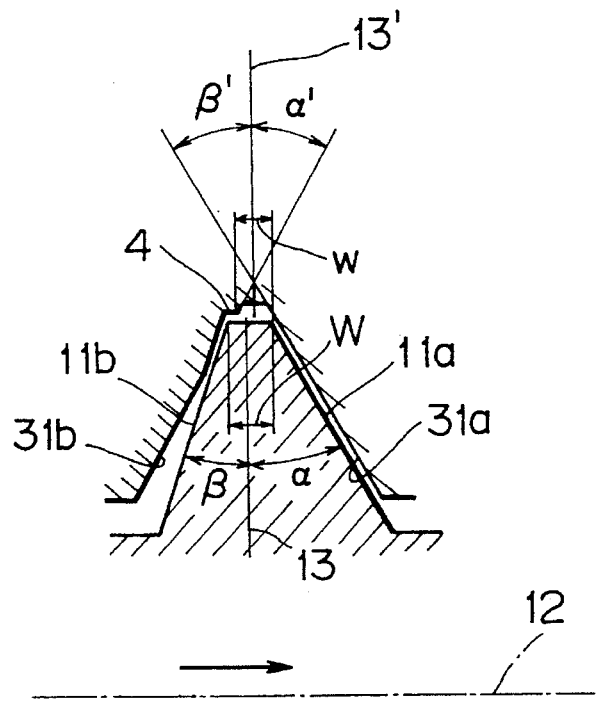
FIG. 3 is an enlarged view of the C portion of FIG. 2.

Another characteristic of the fastening screw described above will be explained with reference to FIG. 3. In FIG. 3, a reference symbol α shows the angle between a slant surface of the fastening screw on the screw-tightening side and a line vertical to an axis 12 of the fastening screw, a reference symbol β the angle between a slant surface of the fastening screw on the screw-loosening side and the line vertical to the axis 12 of the fastening screw.

Further, a reference symbol α' shows the angle between a slant surface of the internal thread on the screw-tightening side and the line vertical to the axis 12 of the fastening screw, a reference symbol β' the angle between a slant surface of the internal thread on the screw-loosening side and the line vertical to the axis 12 of the fastening screw. Those angles of the fastening screw and the internal thread according to the second embodiment of the present invention are determined as β<α or β<β'. In other words, the slant surface 11a of the fastening screw on the screw-tightening side is in parallel to the opposing slant surface 31a of the internal thread, and the slant surface 11b of the fastening screw on the screw-loosening side is steeper in its inclination relative to the axis 12 than is the slant surface 11a of the fastening screw to form an asymmetrical thread. In the fastening screw and the internal thread according to the second embodiment of the present invention shown in FIG. 3, α, α', and β' are set to be 30°, and β is 20°.

The internal thread 3 is formed on the internal thread member 31, and the fastening screw as a bolt or a machine screw is screwed in the internal thread. As described above, the width W of the top of the thread of the fastening screw is larger than the width w of the root where the top flat portion engages the internal thread, and the slant surface 11a of the fastening screw on the screw-tightening side is substantially in parallel to the opposing slant surface 31a of the internal thread, and the slant surface 11b of the fastening screw on the screw-loosening side is steeper relative to the screw axis 12 than is the slant surface 11a of the fastening screw, permitting and engagement in which an end portion of the top of the thread of the fastening screw on the screw-loosening side eats into the internal thread 31a to proceed into the internal thread 31 with the forming of an auxiliary internal thread 4.

Figure 4:
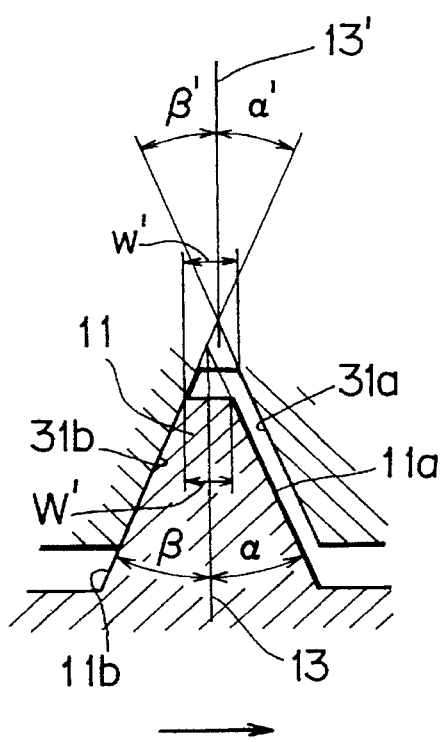
FIG. 4 is a primarily cross-sectional view of a conventional fastening screw and an internal thread.

FIG. 4 shows a primarily cross-sectional view of a conventional fastening screw and an internal thread which are engaged with each other. As clearly illustrated in the figure, all angles α, β, α', and β' are the same, and the width W' of the top thread is equal to or smaller than the width w' of the root. Therefore, the slant surface 11b of the fastening screw on the screw-loosening side is pushed by the slant surface 31b of the internal thread to allow the fastening screw to proceed into the internal thread, and a clearance is shown between the slant surface 11a of the fastening screw on the screw-tightening side and the slant surface 31a of the internal thread which opposes the slant surface 11a. After tightened, an adhering force between the slant surfaces 11b and 31b is susceptible to be reduced due to vibration, which prevents the thread 11 from normally working in the internal thread. As a result, a torque in the screw-loosening direction loosens the fastening screw since it can not resist the torque.

On the other hand, the fastening screw according to the present invention shown in FIGS. 2 and 3 will grasp the internal thread between the auxiliary thread 4 and the slant surface 31a opposing the auxiliary thread, which increases the resistance force against the torque in the screw-loosening direction.

Although the embodiments each shown in FIGS. 1 and 2 each independently provide the desired effect, a fastening screw having both the head shown in FIG. 1 and the internal thread shown in FIG. 2 is more effective to prevent the loosening of the screw, particularly used for an internal thread member like a thin steel plate in which the number of internal threads becomes small, since the both locking functions described above are combined.

With the fastening screw according to the present invention described above, the wavelike portions on the bearing face of the head deform the internal thread member, which increases the contact area of the bearing face and the internal thread member. As a result, a large friction force generated between the bearing face and the internal thread member prevents the fastening screw from loosening even if the torque in the screw-loosening direction works.

Furthermore, the fastening screw according to the present invention is provided with the asymmetrical thread portion and the top thread portion wider than the root of the internal thread, so that the auxiliary internal thread is to be formed on the internal thread member, which allows the thread of the fastening screw to be grasped steadily to resist a torque in the screw-loosening direction. As a result, the loosening of the fastening screw is prevented.

What is claimed is:

1. A fastening screw with a thread portion having a flat top portion, the width of said flat portion being larger than that of a root of a thread portion of an internal thread, wherein a first angle α between a slant surface of the fastening screw on a screw-tightening side thereof and a line perpendicular to an axis of said fastening screw is substantially equal to a second angle β between a slant surface of the internal thread on a screw-loosening side thereof and the line perpendicular to the axis of the fastening screw, and a third angle B between a slant surface of the fastening screw on the screw-loosening side thereof and the perpendicular line is smaller than a fourth angle α between the slant surface of the internal thread on the screw-tightening side thereof and the perpendicular line.

2. The fastening screw according to claim 1, wherein:
said first angle α and said second angles β are each 30° and said third angle β is 20°.

3. The fastening screw according to claim 2, wherein:
said first angle α, said second angle β and said fourth angle α are each 30° and said third angle β is 20°.

4. The fastening screw according to claim 1, wherein: β<α.

5. The fastening screw according to claim 1, wherein: β<β'.

6. A fastening screw having a threaded position for engaging with an internally threaded object, comprising:
   a head having a bearing face;
   a plurality of shallow convex and concave portions formed on said bearing face to cooperatively provide shallow wavelike portions proceeding in a circumferential direction of said bearing face and located to contact the internally threaded object deform the same in use; and
   a thread portion having a flat top portion, a width of said flat portion being larger than that of a root of a thread portion of an internal thread,
   wherein a first angle α between a slant surface of the fastening screw on a screw-tightening side thereof and a line perpendicular to an axis of said fastening screw is substantially equal to a second angle β between a slant surface of the internal thread on a screw-loosening side thereof and the line perpendicular to the axis of the fastening screw, and
   wherein a third angle β between a slant surface of the fastening screw on the screw-loosening side thereof and the perpendicular line is smaller than the first angle α.

7. The fastening screw according to claim 6, wherein:
said shallow wavelike portions have a depth of about 0.04 mm.

* * * * *